UNITED STATES PATENT OFFICE 2,159,550

INSECTICIDAL REPELLANT

James R. Cross, St. Petersburg, Fla., assignor of one-half to T. Frank Hobson, St. Petersburg, Fla.

No Drawing. Application January 3, 1936, Serial No. 57,456

4 Claims. (Cl. 134—40)

This invention relates to an insecticidal repellant and more particularly to a substance for preventing the accumulation of marine growth such as barnacles or the like on the bottom of a boat or other under water structure.

It is an object of the invention to incorporate in a suitable vehicle a substance that will either destroy or repell and thereby prevent accumulation of lower marine life or the like from adhering to the hull of a boat or other under water structures such as piles and the like which are likewise subject to the attack of deteriorating matter.

A further object of my invention is to provide a poison which may be used with appropriate foodstuffs for the purpose of eliminating rodents or other objectionable forms of animal life although the primary purpose of my invention is to provide a mixture of the proper proportions including this poison in a vehicle for application to under water structures for preventing decay and ravages by marine life, insects, vermin, rodents and the like.

Accordingly my invention comprises the use of the juices of which the principal ingredient is catechutannic acid as obtained from the catechu or cutch (terra japonica) which is obtained from the wood and pods of the *Acacia catechu* from the beetle nut or the wood and fruit of the *Areca catechu*, a species of palm tree. Although this acid may be secured as above stated, it is preferably obtained from the native black or red mangrove tree, a plant prolific in Florida, the juices of which are employed in carrying out this invention.

In carrying out my invention I preferably employ a regular marine paint vehicle to which is added catechutannic acid as found in said juices in the proportion of approximately 2 ounces of this catechutannic acid which is of medium strength to a gallon of the paint. Regular applications of this paint to the hulls of boats or other water structures are made at intervals in the customary manner. In this way a repellant is provided which repulses the ravages of animal life indefinitely.

Such a paint vehicle has an advantage in employing catechutannic acid since it is to be noted that this acid is readily soluble in water and added to the marine paint which is applied to under water structures, the repellant qualities of this poison contained in the paint will be greatly intensified. This follows since the paint seals the poison on the structure or in the pores thereof and in the event that the structure is attacked such attacks will permit the emission of the poison.

It will also be seen that catechutannic acid may be added to ordinary paints, stains or varnishes as applied to other surfaces to be coated for preventing the attachment of decadent animal matter and for preservative or decorative purposes. Further this poison may be used in appropriate amounts in foodstuffs for the purpose of eliminating rodents and other objectionable forms of animal life as will readily be understood.

It will be obvious to those skilled in the art that various changes may be made without departing from the spirit of the invention and therefore I do not limit myself to what is described in the specification but only as indicated in the appended claims.

I claim:

1. A method of preventing fouling on surfaces comprising application thereto of the juices obtained from *Acacia catechu*.

2. A method of preventing fouling on surfaces comprising application thereto of the juices obtained from *Areca catechu*.

3. A method of preventing fouling on surfaces comprising application thereto of the juices obtained from the mangrove tree.

4. A coating for surfaces exposed to water embodying the juices of plant life the principal ingredient of which is catechutannic acid.

JAMES R. CROSS.